Aug. 30, 1949.  O. MOHR  2,480,594
ADJUSTABLE CAM DEVICE
Filed Aug. 29, 1946  2 Sheets-Sheet 1

INVENTOR
O. MOHR
BY J. MacDonald
ATTORNEY

Aug. 30, 1949.   O. MOHR   2,480,594
ADJUSTABLE CAM DEVICE

Filed Aug. 29, 1946

INVENTOR
O. MOHR
BY J. MacDonald
ATTORNEY

Patented Aug. 30, 1949

2,480,594

UNITED STATES PATENT OFFICE 2,480,594

ADJUSTABLE CAM DEVICE

Otto Mohr, Jamaica, N. Y., assignor to Bell Telephone Laboratories, Incorporated, New York, N. Y., a corporation of New York Application August 29, 1946, Serial No. 693,648

4 Claims. (Cl. 74—568)

This invention relates to cam devices and more particularly to adjustable cam devices.

The object of the invention is to provide an improved adjustable cam device in which a work member on the cam device may be adjusted and set to present a required curved bearing surface to a movable member engaged by the cam device.

A feature of the invention resides in a chain-like member forming the work member of the cam device.

Another feature resides in spaced adjustable supports for the chain-like member.

Another feature resides in link structures of the chain-like member.

Figure 3:
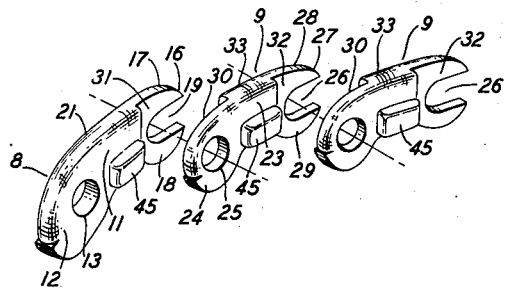
Figs. 3 and 4 show enlarged views, in perspective, of links of the chain-like member.
Figure 4:
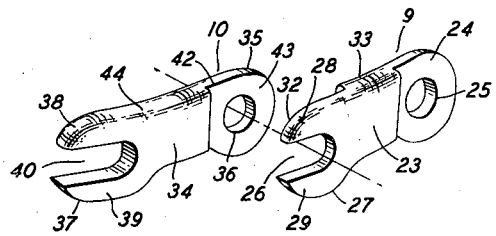

The cam device comprises a support 6 serving as the body of the cam device, and a chain-like member 7 comprising a plurality of links constructed along the general lines of the links 8, 9 and 10 shown in Figs. 3 and 4. The links are of substantial construction and may be members cast or otherwise formed from suitable material. The links 8 and 10 are used as end links of the chain-like member 7, the other link portions in the chain-like member 7 being made up of a plurality of links 9.

Figure 1:
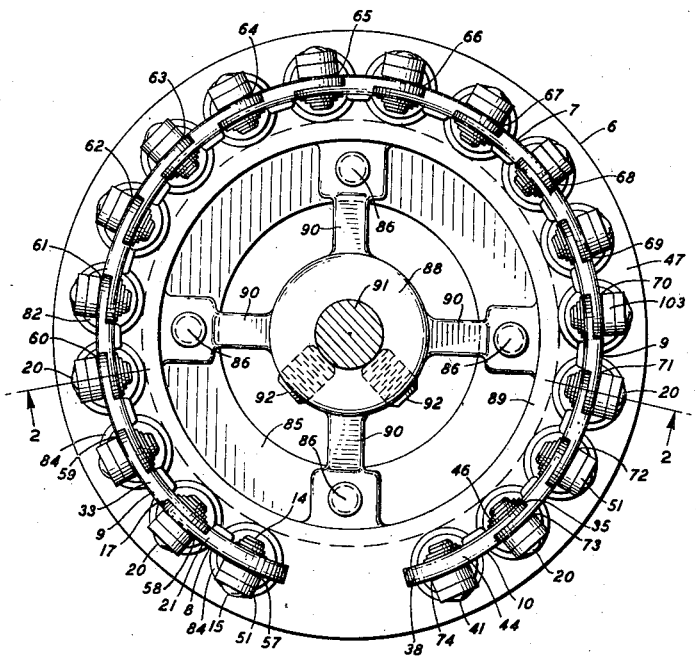
Fig. 1 is a plan view of the cam device embodying the invention.

The link 8 has a block-like body portion 11 terminating at one end in an apertured and rounded end portion 12, the aperture 13 being suitable to accommodate the shank portion 14 of a bolt 15 shown in Fig. 1. The other end of the body portion 11 of the link 8 as shown in Fig. 3 terminates in a bifurcated and rounded end portion 16 which is of reduced thickness as compared with the body portion 11. The fingers 17 and 18 of the end portion 16 cooperatively define an open-ended slot 19 through which a bolt 20 may extend as shown in Fig. 1. An upper edge 21 of the body portion 11 of the link 8 is substantially straight and provides a riding surface for a follower such, for instance, as the follower 22 shown in Fig. 5.

The link 9 as shown in Fig. 3 has a block-like body portion 23 terminating at one end in an apertured and rounded end portion 24, the aperture 25 being arranged and dimensioned to register with the open-ended slot 19 in the link 8 or with a similar open-ended slot 26 in another link 9. The body portion 23 of the link 9 terminates at another end in a rounded and bifurcated end portion 27, the fingers 28 and 29 of which cooperatively define an open-ended slot 26. The rounded and bifurcated end portion 27 of the link 9 is of reduced thickness as compared with the body portion 23 and is laterally offset from the apertured and rounded end portion 24 which, as shown in Fig. 3, has a rear wall 30 arranged for face-to-face engagement with a front wall surface 31 on a link 8 or with the front wall surface 32 on another link 9. An upper edge 33 of the body portion 23 of the link 9 is substantially straight and provides a riding surface for a follower such, for instance, as the follower 22 shown in Fig. 5.

The link 10 as shown in Fig. 4 has a block-like body portion 34 terminating at one end in an apertured and rounded end portion 35, the aperture 36 being suitable to accommodate the shank portion of a bolt so shown in Fig. 1. The other end of the body portion 34 of the link 10 as shown in Fig. 4 terminates in a bifurcated and rounded end portion 37. The fingers 38 and 39 of the end portion 37 cooperatively define an open-ended slot 40 through which a bolt 41 may extend as shown in Fig. 1. The apertured and rounded end portion 35 of the link 10 is reduced in thickness as compared with the body portion 34 and is formed to provide a recess 42 to accommodate the rounded and bifurcated end portion 27 of a link 9, the surface 32 of the link 9 being in this case, arranged for face-to-face engagement with the front face 43 of the recess 42 of the link 10. The upper edge 44 of the body portion 34 of the link 10 is substantially straight and provides a riding surface for a follower such, for instance, as the follower 22 shown in Fig. 5.

The lugs 45 shown on the sides of the links 8 and 9 are strengthening lugs for the links and may be portions of gates formed when the links 8 and 9 are castings and later separated from the main portions of the gate structures after the castings are made.

The chain-like member 7 shown in Fig. 1 is constructed from a plurality of links fitted together and arranged in the manner shown, the links being held together by means of bolts which extend through openings in the links as required to hold the links together in the form of a chain. The links 8 and 10 are end links of the chain-like member 7 and the remaining portion of the chain-like member is made up of a suitable number of links 9. Each link has a portion in overlapping side relation with another link and the overlapping portions of the links are clamped together by means of bolts 20 which are equipped with nuts and washers or other suitable holding means 46 mounted on the shank portions of the bolts. The links 8 and 10 are in spaced relation and the chain-like member 7 is arranged so that the links are supported edgewise relative to the plane of an end portion 47 on the body 6. The chain-like member 7 may be adjusted at required spaced points and relative to the end portion 47 of the body 6 to make the chain-like member 7 present a required wave-like work surface to a follower such, for instance. as the follower 22 shown in Fig. 5, one of the possible wave-like work surfaces attainable being represented by the wave-like line 48 shown in this figure.

In the embodiment of the invention shown in the drawings the chain-like member 7 is arranged in the form of an incomplete circle and the links 8, 9 and 10 are each slightly curved to permit arrangement of the chain-like member 7 about a central point in the body 6. It will be obvious, however, that the chain-like member 7 might be constructed to provide a substantially straight bar adjusted at various points to provide a wave-like work surface to a follower and so that relative sliding movement of the bar or follower would produce a required movement of an end portion of the follower remote from the portion engaging the work surface. In this case the links would not be curved.

The chain-like member 7 is equipped with a plurality of mountings 49 comprising in each case an apertured body portion 50 and an apertured arm portion 51. The body portion 50 is arranged to extend in spaced relation with the chain-like member 7 and at a point opposite from the work surface of the chain-like member 7. The apertured arm portion 51 of the mounting 49 is arranged to extend in spaced relation with a side of the chain-like member 7 and serves as a support for a bolt 15, 20 or 41 as the case may be and according to the requirement. The body portion 50 of each mounting 49 is supported on a rod adjustably mounted in the body 6 and operable to move a portion of the chain-like member 7 relative to the end portion 47 of the body 6. By adjusting each rod as required the chain-like member 7 may be adjusted to make the chain-like member 7 present a wave-like pattern work surface to a follower arranged to keep in contact with the chain-like member 7 and follow the pattern of the work surface of the chain-like member 7.

Figure 2:
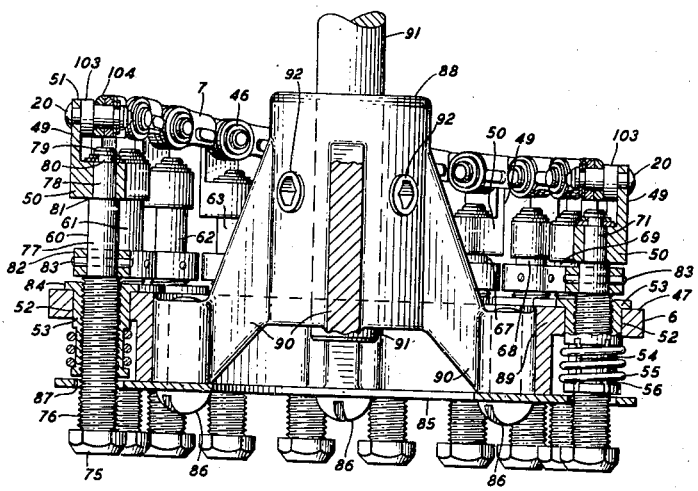
Fig. 2 is a side view, partly in section, of the cam device shown in Fig. 1.

As shown in Figs. 1 and 2 the body 6 has spaced apertures 52 provided therein and in each of which is supported a tubular support 53. The tubular support 53 is internally threaded from end to end and spaced longitudinal openings 54 are provided in the tubular support 53 to make a portion of the tubular support 53 compressible by means of a spring 55 enclosing the tubular support 53 and having a tendency to reduce the internal diameter of the tubular support 53, the spring 55 being disposed around a portion of the tubular support 53 of reduced outside diameter as shown at 56.

Figure 5:
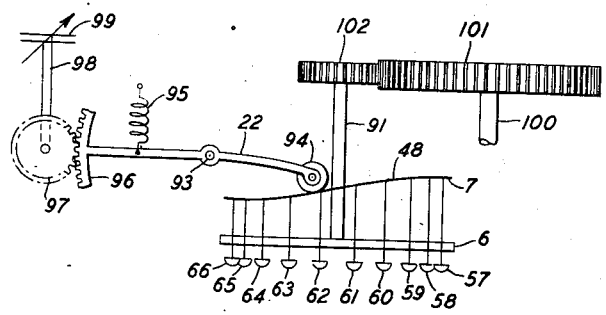
Fig. 5 is a schematic illustration of the cam device in workable engagement with a movable member operating as a control means for a rotatable member and which may be, for instance, the rotor element of a variable electrical air condenser.

Adjustably mounted in tubular supports 53 are rods 57 to 74, inclusive, some of which are shown in Figs. 2 and 5 and others of which are not visible in the figures of the drawings. None of the rods is visible in Fig. 1 but the positions of the rods are indicated in this figure by identification numerals of the rods applied at points where the rods extend through the body 6. Some of the rods may be longer or shorter than others when a part to be operated by means of the cam device has only a limited range of movement and it is desired to construct the cam device so that the chain-like member 7 cannot be set to make or permit the follower to move beyond required limits. In the cam device shown in Fig. 2 the rods are of different lengths but otherwise are constructed alike and a description of one rod will therefore be sufficient for an understanding of the construction of the others. For instance, the only difference in the structures of the rods 60 and 71 are the over-all lengths of the rods and the lengths of unthreaded portions of the rods.

Each rod 57 to 74, inclusive, and with particular reference to the rod 60 comprises a head 75, a male threaded portion 76, an unthreaded portion 77 and a cylindrical reduced diameter portion 78 terminating in an end portion 79 constructed to have mounted thereon retaining means such, for instance, as a nut and washer 80. The reduced diameter portion 78 extends through and is journaled in the body portion 50 of the mounting 49, the base of the body portion 50 resting on a shoulder 81 formed on the rod 60 and the mounting 49 being retained on the rod 60 by means of the retaining means 80. When the rod 60 is rotated in the tubular support 53 a portion of the chain-like member 7 is moved relative to the end portion 47 of the body 6, the direction of movement being in accordance with the adjustment of the rod 60 in the tubular support 53. When the rod 60 is given a right-hand turn the portion of the chain-like member 7 in register with the rod 60 is moved further from the end portion 47 of the body 6. A left-hand turn applied to the rod 60 will cause a portion of the chain-like member 7 to move nearer the end portion 47 of the body 6. Each mounting 49 is in register with an apertured end portion or a bifurcated end portion of a link and when the mounting 49 is moved relative to the end portion 47 of the body 6 the end portion of the link served by the mounting 49 will be moved relative to the end portion 47 of the body 6. In most cases a mounting 49 is in register with overlapped end portions of two links, the end portion of one of the links being an apertured end portion and the end portion of the other link being a bifurcated end portion. The overlapped end portions of the links are in mechanical connection with a mounting 49 through a bolt 20 which extends through an apertured arm portion 51 of the mounting 49 and through the apertured end portion of one link and the corresponding bifurcated end portion of the other link. When a portion of the chain-like member 7 is moved relative to the end portion 47 of the body 6, the bifurcated end portion of the link affected undergoes a pivotal and lengthwise movement since the chain-like member 7 is, in effect, shortened or lengthened due to portions of the end links of the chain-like member 7 being supported against longitudinal movement and other portions of the chain-like member 7 being moved to different planes and relative to the end portion 47 of the body 6.

A collar 82 is mounted on each rod 57 to 74, inclusive, to serve as a stop to limit longitudinal movement of the rod in one direction. The collar 82 is supported on the unthreaded portion 77 of the rod and held in a required predetermined position on the rod by means of a pin or other suitable securing means 83 engaging the collar 82 and the unthreaded portion 77 of the rod. The collar 82 is positioned to engage a flange 84 on a tubular support 53 when a predetermined left-hand turning movement is applied to the rod. Engagement of the collar 82 with the flange 84 prevents further left-hand turning of the rod beyond the required extent.

The rods 57 to 74, inclusive, extend through an apertured plate 85 secured to the body 6 by means of screws 86. The plate 85 is disposed between the heads 75 of the rods 57 to 74 and the body 6 and the apertures 87 in the plate 85 are smaller in diameter than the heads 75 of the rods. When a right-hand turning movement is applied to a rod sufficient to bring the head 75 into engagement with the plate 85 continued right-hand turning of the rod is prevented.

The spring 55 makes a portion of the tubular support 53 closely grip the threaded portion of the rod sufficient to prevent undue rotation of the rod in the tubular support 53 when the cam device is operating.

The body 6 has an apertured hub portion 88 connected to the base portion 89 by means of arm portions 90. The hub portion 88 is constructed for mounting on a rotatable shaft 91 and may be retained on the rotatable shaft 91 by means of set screws 92 or other suitable holding means extended through the hub portion 88 and into contact with the rotatable shaft 91. When the shaft 91 is rotated the body 6 is rotated and also the chain-like member 7.

The cam device above described may be used to operate a follower 22 shown in Fig. 5. In this case the follower 22 is pivotally supported at 93 and is equipped with a roller 94 arranged to ride on the chain-like member 7. The roller 94 bears against the chain-like member 7 and so that the roller 94 will ride on the upper edge portions 21, 33 and 44 of the links 8, 9 and 10, respectively, as the links come under the roller 94. The roller 94 may be maintained in engagement with the chain-like member 7 by means of a spring 95 secured at one end to a required point on the follower 22 and at the other end to a suitable support, not shown. The follower 22 shown in Fig. 5 is equipped with a gear portion 96 in mesh with a gear wheel 97 which may be attached to the rotor shaft 98 of a variable condenser 99. When the shaft 91 is rotated the follower 22 is operated under control of the chain-like member 7. Relatively high portions on the chain-like member 7 will cause the roller 94 to rise against the action of the spring 95. Relatively low portions on the chain-like member 7 will allow the roller 94 to descend under the action of the spring 95. The chain-like member 7 may be adjusted at various points along its length to present to the roller 94 a work surface of required wave line form represented by the wave-like line 48. The rods 57 to 74, inclusive, in the cam device may be adjusted as required to make relatively high and low spots on the work surface. The pattern of the work surface represented by the wave-like line 48 may therefore be changed as required to make the follower 22 operate in accordance with a required program.

The shaft 91 may be rotated by means of a rotatable shaft 100 in driving connection with the rotatable shaft 91 through gears 101 and 102.

In order to keep the pivotally supported ends of the various links of the chain-like member 7 in register with the corresponding adjustment rods, washers 103 may be mounted on the bolts 15, 20 and 41, the washers 103 being located between the arm portions 51 of the mountings 49 and one side of the chain-like member 7.

The upper edges of the links 8, 9 and 10 may be rounded off as required to make the upper edge of the chain-like member 7 be of half-round form in cross-section as shown at 104 in Fig. 2.

What is claimed is:

1. A cam device comprising a chain-like member, an apertured support for said chain-like member, links in said chain-like member set up edgewise and cooperating to form a work surface for a member to be controlled by the cam device, apertured end portions in each of said links and having side recesses formed therein, the recess on one end being on an opposite side from the recess on the other end, one of the apertures in each link being larger than another and being open through an end portion of the link, bolt means extending through the apertures in the links and holding two links in pivoted connection, and adjusting rod means supported in said apertured support and in mechanical connection with said links and operable to adjust said links to make said chain-like member present a work surface of required form.

2. A cam device comprising a support, a chain-like member arranged on said support and forming a cam surface in said cam device, links in said chain-like member, supporting rod means for said links adjustably mounted in said support and operable to move said links relative to said support and side recessed end portions in said links arranged in overlapping relation and one end of each link being bifurcated and having the side recess on an opposite side from the position of the recess on the other end of the link and constructed to permit lengthening and shortening of said chain-like member when said links are being moved by said supporting rod means relative to said support.

3. A cam device comprising a body, a chain-like member arranged on said body and forming a cam member in said cam device, links in said chain-like member having edge portions, said links being arranged to make the edge portions thereof cooperatively form a cam surface, rods adjustably supported in said body in spaced relation and in mechanical connection with said links and operable to adjust said links relative to said body to make said chain-like member present a required wave-like pattern, spring-pressed tubular support means mounted in said body to hold said rods in adjusted positions, end portions in said links arranged in overlapping relation, the end portions of the links being apertured to accommodate bolt means operating to hold the links together and the aperture in one of the link ends being elongated and open through the link-end to permit one link to slide lengthwise relative to another link.

4. A cam device comprising an apertured body, a chain-like member arranged in circular form and supported on said body, curved links forming said chain-like member, each of said links having an apertured end portion and a bifurcated end portion, the bifurcated end portion of one link being arranged in overlapping side relation with the apertured end portion of the next link and the overlapping end portions of adjacent links being recessed on their meeting sides to accommodate each other, bolt members holding said curved links together to cooperatively form said chain-like member, an apertured bracket forming a support for each bolt member, a screw-threaded rod extending into each bracket and forming an adjustable support for said bracket, an internally threaded tubular support for said screw-threaded rod, said tubular support being mounted in said apertured body and forming an internally threaded bushing type supporting member for said screw-threaded rod, flexible finger portions formed in said tubular support and bearing against the threaded portion of said screw-threaded rod, and a helical spring member mounted on and extending around said tubular support and operating to press said flexible finger portions against the threaded portion of said screw-threaded rod.

OTTO MOHR.

REFERENCES CITED

The following references are of record in the file of this patent:

UNITED STATES PATENTS

| Number | Name | Date |
|---|---|---|
| 2,180,766 | Pearson | Nov. 21, 1939 |
| 2,188,108 | Dorman | Jan. 23, 1940 |
| 2,366,573 | Swallow | Jan. 2, 1945 |